US008161174B1

(12) United States Patent
Sankaranaynan et al.

(10) Patent No.: US 8,161,174 B1
(45) Date of Patent: Apr. 17, 2012

(54) DERIVING TIME ATTRIBUTES FOR A DEVICE

(75) Inventors: Pallavur Sankaranaraynan, Overland Park, KS (US); Brian D. Mauer, Shawnee, KS (US); Matthew C. Schlesener, Shawnee, KS (US); Sean Alan Isaacson, Raymore, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 506 days.

(21) Appl. No.: 11/757,531

(22) Filed: Jun. 4, 2007

(51) Int. Cl.
*G06F 15/16* (2006.01)
(52) U.S. Cl. .......... 709/229; 709/228; 709/227
(58) Field of Classification Search .......... 709/229, 709/227, 228
See application file for complete search history.

(56) References Cited

U.S. PATENT DOCUMENTS

| 5,845,257 | A | * | 12/1998 | Fu et al. | 705/8 |
| 6,198,696 | B1 | | 3/2001 | Korpi et al. | |
| 7,330,720 | B2 | * | 2/2008 | Hinz | 455/422.1 |
| 2006/0252424 | A1 | * | 11/2006 | Ohno et al. | 455/432.1 |
| 2006/0252438 | A1 | * | 11/2006 | Ansamaa et al. | 455/503 |

OTHER PUBLICATIONS

D.K.Siu, "Synchronous Optical NETwork (SONET)," Worcester Polytechnic Institute, 1997, pp. 1-24, see website: http//www.techfest.com/networking/wan/dks1/dks1.htm.

* cited by examiner

*Primary Examiner* — Jeffrey Pwu
*Assistant Examiner* — Shripal Khajuria

(57) ABSTRACT

A method and system are provided to derive time attributes for a device. An embodiment of the method includes obtaining a time attribute based on a device-mode and a corresponding time attribute based on a device-location. The corresponding time attributes are compared. Upon comparison, if the time attribute based on a device-mode differs from the time attribute based on a device-location, an update indication to modify the first time attribute to conform with the second time attribute is communicated.

18 Claims, 4 Drawing Sheets

DERIVING TIME ATTRIBUTES FOR A DEVICE

CROSS-REFERENCE TO RELATED APPLICATIONS

Not applicable.

STATEMENT REGARDING FEDERALLY SPONSORED RESEARCH OR DEVELOPMENT

Not applicable.

SUMMARY

The present invention is defined by the claims below. Embodiments of the present invention provide a system and method for, among other things, deriving time attributes for a device utilizing a network based wireless solution. The present invention has several practical applications in the technical arts including updating the time within a device to conform with the local time based on the location of the device.

In a first illustrative aspect, a wireless system for deriving a time attribute of a device. The system includes a device-mode identifier configured to obtain a first time attribute based on a device-mode; a device-location identifier configured to obtain a second time attribute based on a device-location; and a time attribute updater configured to compare the first time attribute and the second time attribute, wherein when the time attribute updater determines that the first time attribute and the second time attribute differ, the time attribute updater communicates an update indication to modify the first time attribute to conform with the second time attribute.

In a second aspect, one or more computer-readable media having computer-executable instructions embodied thereon that, when executed perform a method for deriving a time attribute of a device. The method includes obtaining a first time attribute based on a mode of the device; obtaining a second time attribute based on a location of the device; comparing the first time attribute and the second time attribute; and if the first time attribute differs from the second time attribute, communicating an update indication to modify the first time attribute to conform with the second time attribute.

In a final illustrative aspect, one or more computer-readable media having computer-executable instructions embodied thereon that, when executed perform a method for deriving a time attribute of a device. The method comprising communicating one or more time attributes of a device-mode; and receiving an update indication to modify the first time attribute to conform with the second time attribute.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
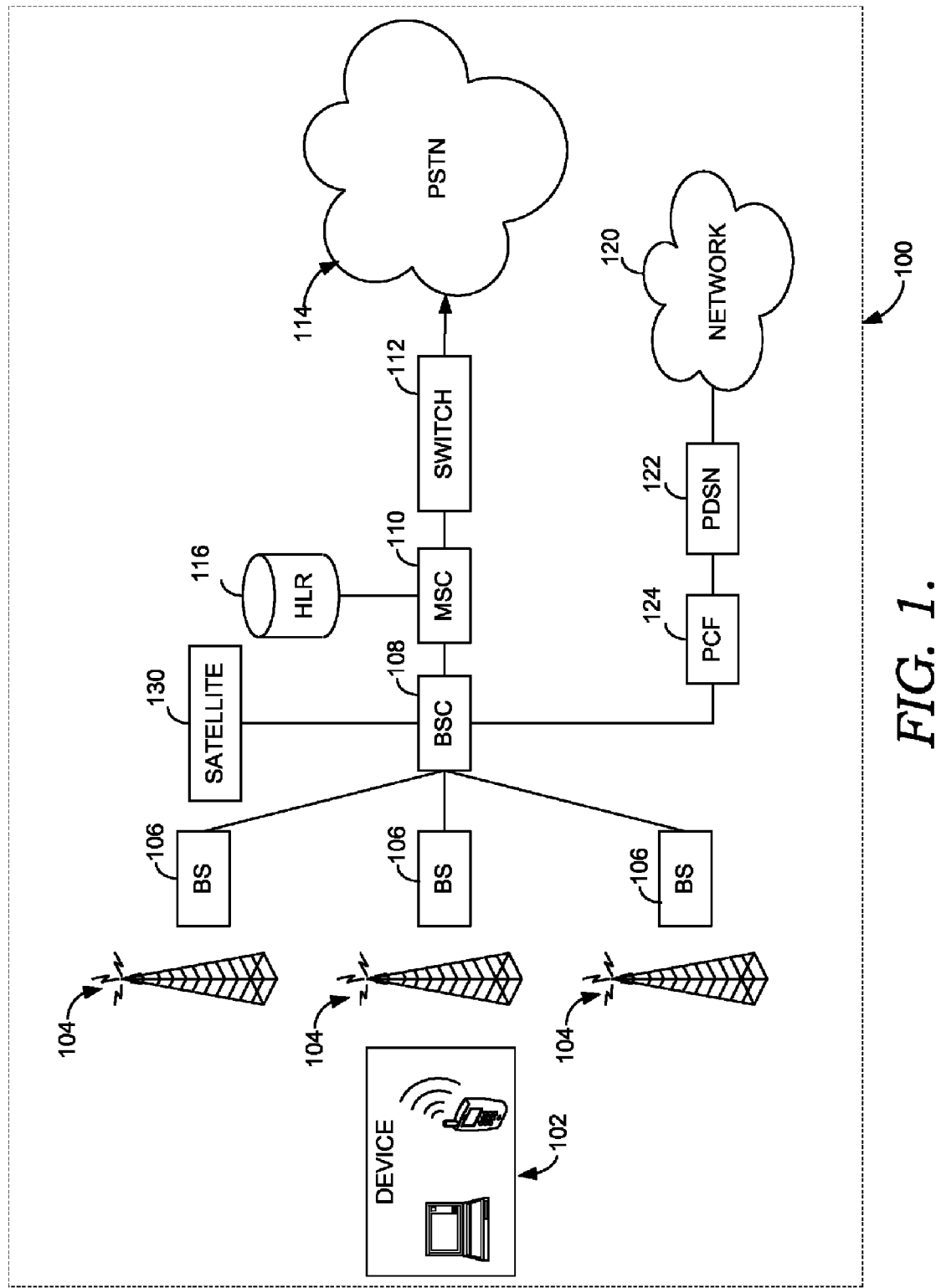
FIG. 1 is a schematic view of an exemplary wireless communications environment suitable for use in implementing the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| 1xRTT | One Times Radio Transmission Technology |
| 4G | Fourth-Generation Cellular Communication System |
| ASIC | Application Specific Integrated Circuit |
| BS | Base Station |
| BSC | Base Station Controller |
| CD | Compact Disk |
| CD-ROM | Compact Disk Read Only Memory |
| CDT | Central Daylight Time |
| CST | Central Standard Time |
| DVD | Digital Versatile Discs |
| EEPROM | Electrically Erasable Programmable Read Only Memory |
| EST | Eastern Standard Time |
| EVDC | Evolution-Data Optimized |
| GPRS | General Packet Radio Service |
| GPS | Global Positioning System |
| HLR | Home Location Register |
| MP3 | MPEG-1 Audio Layer 3 |
| MSC | Mobile Switching Center |
| PCF | Packet Control Function |
| PCI | Peripheral Component Interconnect |
| PDA | Personal Digital Assistant |
| PDSN | Packet Data Serving Node |
| PSTN | Public Switched Telephone Network |
| RAM | Random Access Memory |
| ROM | Read Only Memory |
| TV | Television |
| UTC | Coordinated Universal Time |
| VCR | Videocassette Recorder |
| WIMAX | Worldwide Interoperability for Microwave Access |

Further, various technical terms are used throughout this description. A definition of such terms can be found in *Newton's Telecom Dictionary* by H. Newton, 21$^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

Embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Referring initially to FIG. 1 in particular, an exemplary wireless network environment 100 is depicted. In the environment 100, a device 102 communicates over established radio frequencies through a cell tower 104 having a base station (BS) 106, a number of which are typically connected to a base station controller (BSC) 108. The BSC 108 manages the communication between a number of BSs 106 and a limited number of devices 102 compatible with the wireless network 100.

The device 102 may communicate with the public switched telephone network (PSTN) 114. In such a case, the BSC 108 connects to a mobile switching center (MSC) 110 acting as a telephone exchange to handle the device activity through the associated one or more BSCs 108 while connecting as needed through a telecommunications switch 112 to the PSTN 114 or other data network. The wireless network 100 also includes a home location register (HLR) 116. HLR 116 is a database used to identify and verify a subscriber and maintain subscriber information, e.g., subscriber details related to features and services. The HLR 116 may be associated with a particular MSC 110, as illustrated in FIG. 1, integrated with the MSC 110, or alternatively may service multiple MSCs 110.

The device 102 may also communicate with one or more networks 120, such as mobile wireless service provider networks, via a packet data serving node (PDSN) 122. A packet control function (PCF) 124 controls the transmission of packets between the BSC 108 and the PDSN 122. The PDSN 122 may connect BSC 108/PCF 124 to network 120. PDSN 122 may then act as a network access server, providing a device access to network 120. Alternatively or additionally, the wireless network environment 100 may include other network elements for providing device access to network 120.

In the present exemplary embodiment, BSC 108 is enabled to receive GPS signals from satellites 130 to indicate the time. As such, service providers and corresponding users are able to maintain synchronized with other service providers and corresponding users. GPS technology employs a constellation of satellites 130 that orbit the Earth.

Figure 2:
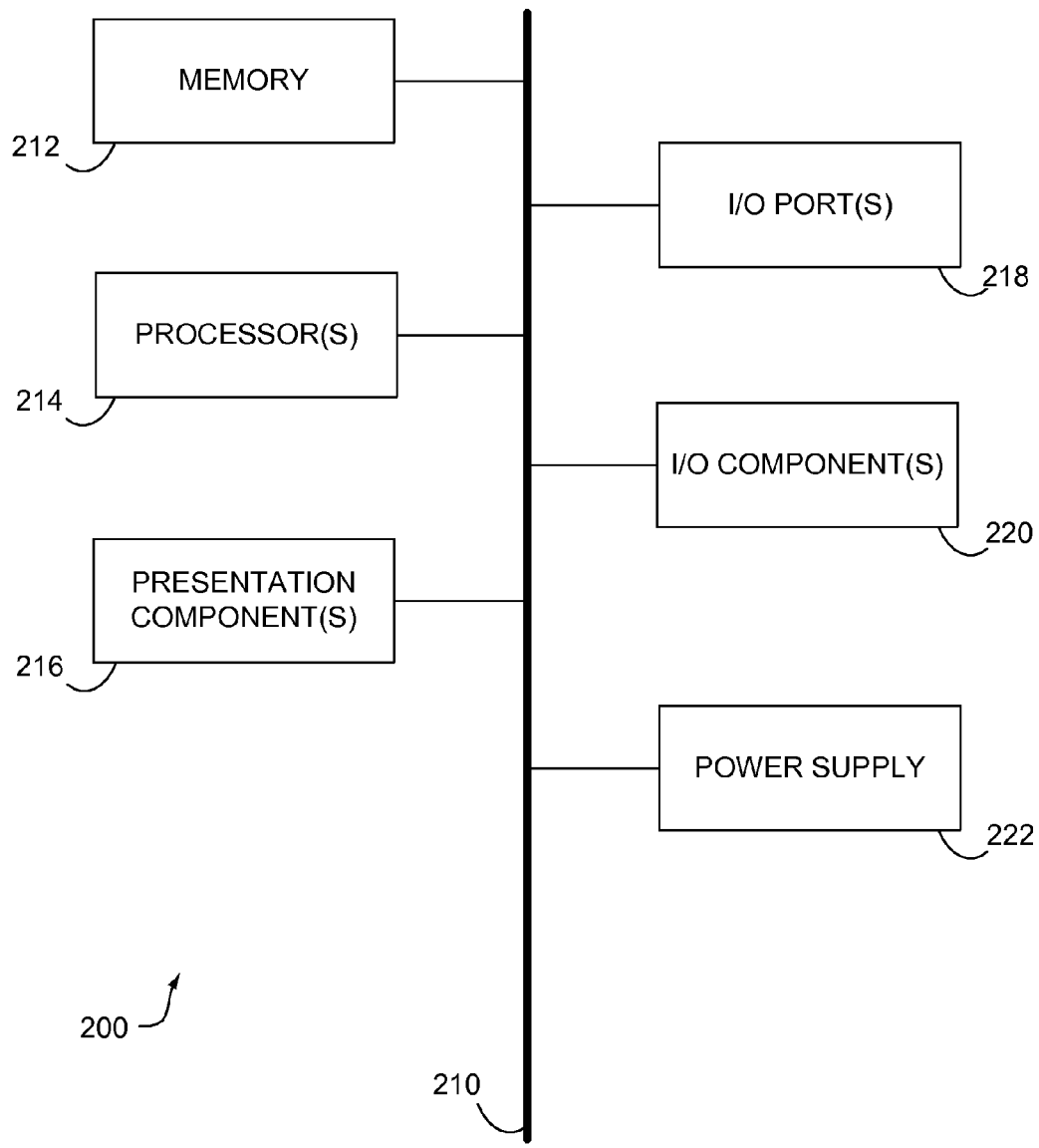
FIG. 2 is a schematic view of an exemplary operating environment suitable for use in implementing the present invention.

With reference to FIG. 2, an exemplary operating environment for implementing the present invention is shown and designated generally as computing device 200. Computing device 200 is but one example of a suitable computing environment and is not intended to suggest any limitation as to the scope of use or functionality of the invention. Neither should the computing environment 200 be interpreted as having any dependency or requirement relating to any one or combination of components illustrated.

The invention may be described in the general context of computer code or machine-useable instructions, including computer-executable instructions such as program modules, being executed by a computer or other machine. Generally, program modules including routines, programs, objects, components, data structures, etc., refer to code that perform particular tasks or implement particular abstract data types. The invention may be practiced in a variety of system configurations, including mobile telephones, general-purpose computers, more specialty computing devices, etc. The invention may also be practiced in distributed computing environments where tasks are performed by remote-processing devices that are linked through a communications network.

With reference to FIG. 2, computing device 200 includes a bus 210 that directly or indirectly couples the following devices: memory 212, one or more processors 214, one or more presentation components 216, input/output ports 218, input/output components 220, and an illustrative power supply 222. Bus 210 represents what may be one or more buses (such as an address bus, data bus, or combination thereof). Although the various blocks of FIG. 2 are shown with lines for the sake of clarity, in reality, delineating various components is not so clear, and metaphorically, the lines would be more accurately be grey and fuzzy. For example, one may consider a presentation component such as a display device to be an I/O component. Also, processors have memory. We recognize that such is the nature of the art, and reiterate that the diagram of FIG. 2 is merely illustrative of an exemplary computing device that can be used in connection with one or more embodiments of the present invention.

Computing device 200 typically includes a variety of computer-readable media. By way of example, and not limitation, computer-readable media may comprises Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 200.

Memory 212 includes computer-storage media in the form of volatile and/or nonvolatile memory. The memory may be removable, nonremovable, or a combination thereof. Exemplary hardware devices include solid-state memory, hard drives, optical-disc drives, etc. Computing device 200 includes one or more processors that read data from various entities such as memory 112 or I/O components 220. In the case of a mobile telephone, for example, the one or more processors 214 may include an application specific integrated circuit (ASIC) where memory 212 is located on the one or more processors 214. Presentation component(s) 216 present data indications to a user or other device. Exemplary presentation components include a display device, speaker, printing component, vibrating component, etc. I/O ports 218 allow computing device 200 to be logically coupled to other devices including I/O components 220, some of which may be built in.

Figure 3:
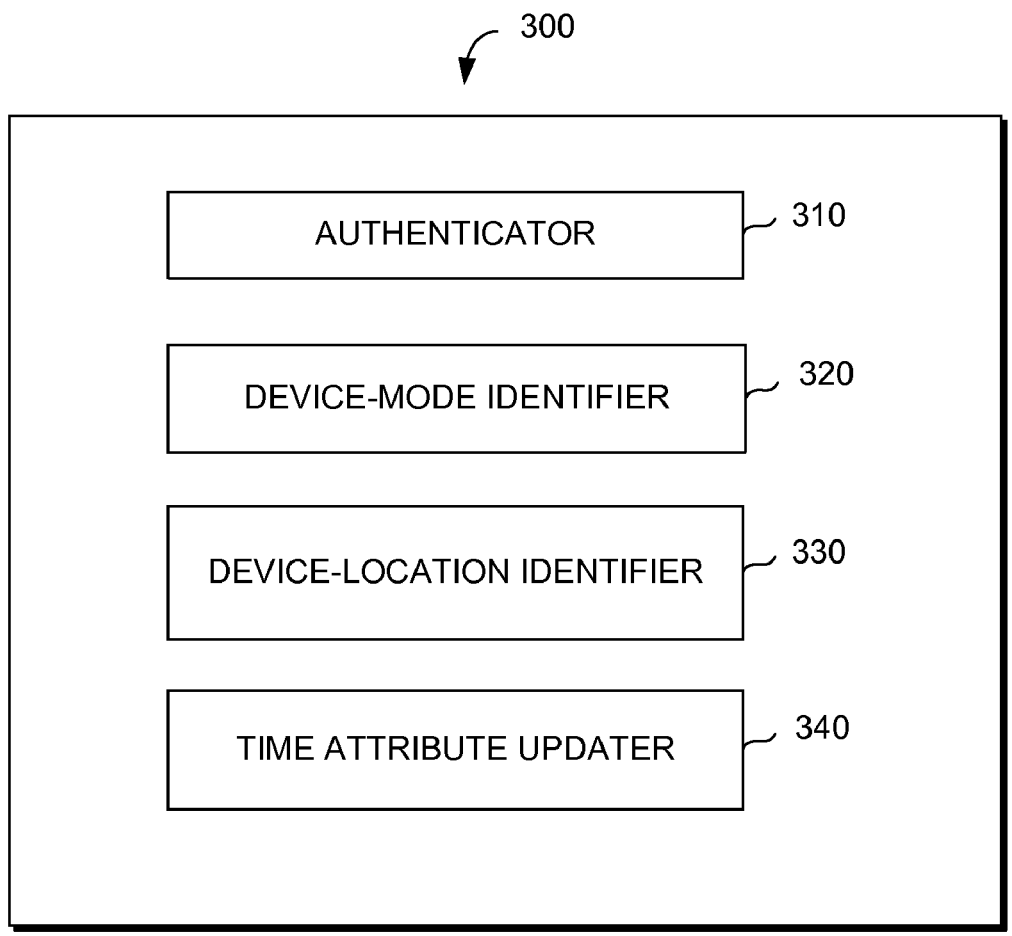
FIG. 3 is a block diagram depicting an exemplary computing system for deriving a time attribute of a device, according to an embodiment of the present invention.

Referring now to FIG. 3, an exemplary computing system 300 for deriving a time attribute of a device utilizing a network based wireless solution is illustrated. As used herein, a time attribute may comprise any element associated with time. By way of example, and not limitation, a time attribute may refer to any form of a time value, e.g., 8:23, 20:23, eight twenty three, and eight hours and twenty three minutes; a time zone, e.g., CST and EST; a date, e.g., May 14, 2007 and May 14, 2007; a day of the week, e.g., Monday; a month, e.g., May; a year, e.g., 2007; a timekeeping convention, e.g., a.m. and p.m.; and the like.

Often times, one or more time attributes deviate from the actual time, such as the GPS time, coordinated universal time (UTC), or atomic time, of the device-location. By way of example only, assume a device time attribute is set to 11:00 a.m. prior to daylight savings. Upon the transition to daylight savings time, although a user may be able to manually advance the time by one hour to 12:00 p.m., the device may not automatically update the time. As such, one or more time attributes, such as a time value, e.g., 11:00, a time zone, e.g., CST, and a timekeeping convention, e.g., a.m., may deviate from the actual time attributes, e.g., 12:00 p.m. CDT, of the device-location. A device time attribute may also deviate from the actual time of the device-location in instances where the device transferred from one time zone to another time zone or where the device drifts out of synchronization. Because one or more device time attributes may deviate from the actual time of the device-location, updating one or more time attributes of a device to the actual time enables the device to initially achieve and/or maintain accuracy.

Computing system 300 may derive time attributes for a time attribute associated with an operating system or any application associated therewith. Because applications may utilize time attributes associated with an operating system, deriving time attributes for the operating system may, accordingly, enhance the accuracy and functionality of such applications. As such, where an application derives time from an operating system, an update to the operating system time attribute automatically updates associated applications. By way of example only, assume an electronic calendaring appointment in Washington D.C. is set for 12:00 p.m. CST on Monday, May 14, 2007. Prior to the appointment time, a user transfers the device setting forth the electronic calendaring appointment from a location in CST to Washington D.C., which has an EST time zone. Due to the time zone difference, time attributes of the device operating system deviate from the actual time of the device-location. Assume further that the user does not manually modify the time attributes associated with the device operating system. Accordingly, because the electronic calendaring solution utilizes time attributes associated with the operating system, the electronic calendaring solution continues to display the appointment for 12:00 p.m. CST, even though the user and the device are located in EST. As such, the user may fail to attend the scheduled appointment due to the failure to update the time attributes. On the other hand, deriving time attributes to update the operating system, and thereby the electronic calendaring appointment, provides for optimal functionality.

In addition, deriving time attributes for testing applications, or operating systems associated therewith, may also enhance the accuracy and functionality of the testing application and associated hardware. For example, in an instance where a testing application, such as a voice quality testing application, is utilized to perform testing between two or more devices that have varying time attributes, inaccurate measurements may be obtained. On the other hand, where each of the two or more devices have corresponding time attributes, more accurate testing measurements may be obtained. Such real-time synchronization provides for optimal functionality of testing applications.

A time attribute may be derived for devices having a network based wireless solution, such as, for example, evolution-data optimized (EVDO), worldwide interoperability for microwave access (WiMAX), general packet radio service (GPRS), 1 times radio transmission technology (1×RTT), fourth-generation cellular communication system (4G), and the like. The network based wireless solution may be provided, in part, via a chipset, an expansion card, e.g., air card or peripheral component interconnect (PCI) card, or the like. In some embodiments, the expansion card may include one or more batteries such that the device is connected with the network even in instances where the power to the device is off. Devices having a network based wireless solution may include phones, laptops, personal digital assistants (PDAs), digital dictation devices, appliances, TVs, VCRs, DVD players, cameras, MP3 players, CD players, gaming devices, and the like.

As shown in FIG. 3 an exemplary computing system 300 includes the following modules: an authenticator 310, a device-mode identifier 320, a device-location identifier 330, and a time attribute updater 340. In some embodiments, one or more of the illustrated modules may be implemented as one or more stand-alone applications. In other embodiments, one or more of the illustrated modules may be integrated directly into the operating system or an application of the server 202 and/or the end-user device 206. In one embodiment, at least a portion of the exemplary computing system 300 may comprise a Connection Manager having the recited modules. Such a system may be programmed in any programming language including, but not limited to Java™, C++, and the like. It will be understood by those of ordinary skill in the art that the modules illustrated in FIG. 3 are exemplary in nature and in number and should not be construed as limited. Any number of modules may be employed to achieve the desired functionality within the scope of embodiments hereof. Further, modules may be located on any number of servers of computing devices.

The authenticator 310 is configured to verify the user or device utilizing the network. In some embodiments, authenticator 310 may be initiated upon receiving an indication based on a user's selection of an authentication icon and, in some instances, thereafter entering an identifier. Alternatively, an indication to initiate authentication may be received based on a predefined event, such as a time, time duration, or computer function, e.g., computer initialization. In some embodiments, upon authorization, the authenticator 310, such as a Connection Manager module, may register the device, for example, with an HLR.

The device-mode identifier 320 is configured to obtain one or more time attributes based on a device-mode. As used herein, device-mode refers to the settings associated with a device. As such, one or more time attributes based on a device-mode may include any time attributes associated with a setting of the device. For example, assume a device, such as a laptop computer, has time settings including one time setting that indicates the time is 2:20. In such a case, one time attribute based on a device-mode is the time value 2:20.

In one embodiment, to obtain one or more time attributes based on a device-mode, the device-mode identifier 320 may determine the device-mode time attributes. In an alternative embodiment, the device-mode identifier 320, such as a Connection Manager module, may obtain one or more time attributes based on a device-mode by receiving or retrieving the device-mode time attributes from another determining module, such as a module residing within the operating system. Such a determining module may determine one or more time attributes based on a device-mode upon request by the device-mode identifier 320. For example, the device-mode identifier 320 may request the operating system to identify one or more time attributes based on the device-mode. Thereafter, the operating system may determine and/or identify one or more device-mode time attributes. Alternatively, such a determining module may automatically determine device-mode time attributes. In one instance, the automatic determination may be based on an event, e.g., time, time duration, or computer function such as receiving a time attribute based on a device-location.

Notwithstanding whether such a determining module determines device-mode time attributes based on a request or automatically, the determining module may communicate the identified device-mode time attributes by sending or pushing the time attributes to the device-mode identifier 320 such that device-mode identifier 320 receives the time attributes or by storing the time attributes such that device-mode identifier 320 may retrieve the time attributes. Where the determining module sends the device-mode time attributes to the device-mode identifier 320, the time attributes may be communicated upon a request from the device-mode identifier 320 or automatically, e.g., upon determining the device-mode time attributes, upon a specific computer function, or upon a certain time or time duration. On the other hand, where the determining module stores the device-mode time attributes such that the device-mode identifier 320 may retrieve the time attributes, determining module may store the time attributes until the device-mode identifier 320 retrieves the identified time attributes.

The device-location identifier 330 is configured to obtain one or more time attributes based on a device-location. As used herein, the device-location refers to the location of the device. Accordingly, a time attribute based on a device-location may be any time attribute associated with the location of the device. For example, if it is 1:00 CST and the device is located in EST, time attributes based on the device-location may include a time value of 2:00 and a time zone of EST.

In some embodiments, the location of the device may correspond to the location of the BS to which the device is connected. By way of example only, assume a device located at position one is connected with a BS located at position two. In such an instance, although the device is located at position one, the one or more time attributes based on a device-location correspond to the location of the BS, i.e., position two. Accordingly, where the BS is located in time zone CST, the time zone time attribute based on a device-location is also CST.

In one embodiment, to obtain one or more time attributes based on a device-location, the device-location identifier 330 may determine the device-location time attributes. In such an embodiment, the device-location identifier 330 may utilize a GPS system to determine time attributes based on a location device. In an alternative embodiment, the device-location identifier 330, such as a Connection Manager module, may obtain one or more time attributes based on a device-location by receiving or retrieving the device-location time attributes from another determining module, such as a determining module residing within a BS. As previously mentioned, a BS may be enabled to obtain GPS signals from satellites to indicate time attributes for the BS. Such a determining module may determine one or more time attributes based on a device-location upon request by the device-location identifier 330. For example, the device-location identifier 330 may request the BS to identify one or more time attributes based on the device-location. Thereafter, the BS may determine and/or identify one or more device-location time attributes. Alternatively, such a determining module may automatically determine device-location time attributes. In one instance, the automatic determination may be based on an event, e.g., upon a specific time or time duration or upon transferring BSs.

Regardless of whether such a determining module determines device-location time attributes based on a request or automatically, the determining module may communicate the identified device-location time attributes by sending the time attributes to the device-location identifier 330 such that the device-location identifier 330 receives the time attributes or by storing the time attributes such that the device-location identifier 330 may retrieve the time attributes. Where the determining module sends or pushes the device-location time attributes to the device-location identifier 330, the time attributes may be communicated upon a request from the device-location identifier 330 or automatically, e.g., upon determining the device-location time attributes, upon authenticating the device, upon a specific computer function such as initialization, upon a specific time or time duration, upon transferring BSs, upon a change in one or more time attributes, and the like. For example, where a device is initially connected to a first base station and transfers to a second base station, the second base station may automatically communicate or push the respective device-location time attribute to the device-location identifier 330. In an embodiment wherein an expansion card having one or more batteries is utilized, the time attributes may be communicated even when the device is turned off. On the other hand, where the determining module stores the device-mode time attributes such that the device-location identifier 330 may retrieve the time attributes, determining module may store the time attributes until the device-location identifier 330 retrieves the identified time attributes.

The time attribute updater 340 is configured to compare one or more time attributes based on a device-mode to one or more corresponding time attributes based on a device-location. A time attribute based on a device-mode corresponds to a time attribute based on a device-location if both attributes are the same type of attribute, i.e., time value, time zone, and the like. For example, a time zone time attribute based on a device-mode, e.g., CST, corresponds to a time zone time attribute based on a device-location, e.g., EST. As such, the time attribute based on a device-mode may be compared to the time attribute based on a device-location.

In instances where a time attribute based on a device-mode differs from a corresponding time attribute based on a device-location, the time attribute updater 340 may also be configured to communicate an update indication to modify the time attribute based on a device-mode to conform with the time attribute based on a device-location. For example, upon comparing a device-mode time attribute of CST to a device-mode time attribute of EST, the time attribute updater 340, such as a Connection Manager module, may determine that the two time attributes differ. In such a case, the time attribute updater 340 may communicate an update indication to modify the device-mode time attribute, i.e., CST, to conform with the time attribute based on a device-location, i.e., EST.

In one embodiment, communicating an update indication may result in a notification to an updating module, such as an operating system module, that one or more time attributes of the device-mode have deviated from one or more time attributes based on a device-location as well as the accurate time attribute for the device-location. The updating module may thereafter update one or more time attributes. In an another embodiment, communicating an update indication may result in a request to an updating module, such as an operating system module, to update one or more time attributes to conform with one or more device-location time attributes. Thereafter, the updating module may update one or more time attributes. Alternatively, communicating an update indication may result in the time attribute updater 340 updating one or more time attributes to conform with one or more device-location attributes.

In some embodiments, one or more time attributes based on a device-mode may be automatically updated, by either time attribute updater 340 or other updating module, such as an Operating System module, to conform with one or more time attributes based on a device-location, e.g., upon performing the comparison, upon a specific time or time duration, upon a specific computer function, and the like.

In other embodiments, device-mode time attributes may only be updated upon a user indicating such a desire. For example, upon determining that a time attribute based on a device-mode differs from a corresponding time attribute based on a device-location, either the time attribute updater 340 or other updating module may present a display box notifying the user of the time attribute deviation. In some instances, the display box may provide the user with a mere notification of a time attribute deviation such that the user may change the time attribute if so desired. In other instances, the display box may notify the user of a time attribute deviation and allow the user to select to accept or decline the time attribute update. For example, in some instances, a device may be located in one time zone while connected to a BS in a second time zone. In such an instance, the display box may notify the user of a time attribute deviation and the user may select whether to change a time attribute of the device.

Figure 4:
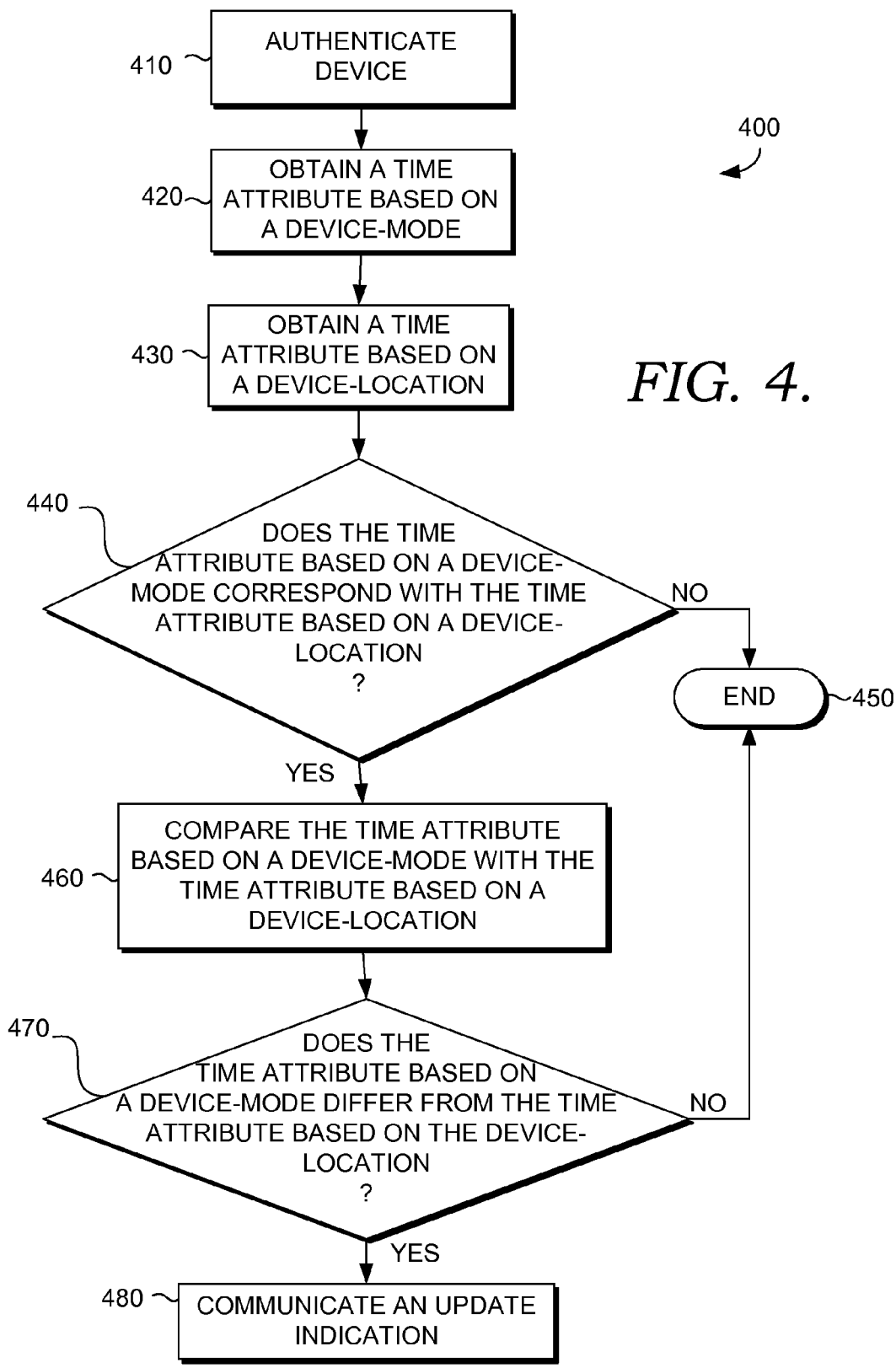
FIG. 4 is an exemplary flow diagram that illustrates deriving a time attribute of a device, according to an embodiment of the present invention.

Turning now to FIG. 4, a flow diagram is shown illustrating a method 400 for deriving a time attribute of a device, in accordance with an embodiment of the present invention. Initially, as indicated at block 410, a device desiring to utilize the network is authenticated. Subsequently, at block 420, a time attribute based on a device-mode is obtained. As indicated at block 430, a time attributed based on a device-location is obtained. Thereafter, at block 440, it is determined if the time attribute based on a device-mode corresponds to the time attribute based on the device-location. If the time attribute based on a device-mode does not correspond to the time attribute based on the device-location, the method ends at block 450. If, however, the time attribute based on a device-mode corresponds to the time attribute based on a device-location, the device-mode time attribute and the device-location time attribute are compared at block 460. Subsequently, at block 470, it is determined if the device-mode time attribute differs from the device-location time attribute. If the device-mode time attribute does not differ from the device-location time attribute, the method ends at block 450. On the other hand, if the device-mode time attribute differs from the device-location time attribute, an update indication to modify the device-mode time attribute to conform to the device-location time attribute is communicated. This is indicated at block 480.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A wireless system for deriving a time attribute of a device, the system comprising:
    a device-mode identifier configured to obtain a first time attribute based on a time set on the device, wherein the time set on the device is the device operating-system time;
    a device-location identifier configured to obtain through a mobile telecommunications network a second time attribute based on a time corresponding with a current location of the device, wherein the current location includes a location of a base station to which the device is connected via a cell tower associated with the base station; and
    a time attribute updater on the device configured to compare the first time attribute based on the time set on the device and the second time attribute based on the time corresponding with the current location of the device, wherein the time attribute updater determines whether the first time attribute based on the time set on the device and the second time attribute based on the time corresponding with the current location of the device differ,
    wherein when the time attribute updater determines that the first time attribute based on the time set on the device and the second time attribute obtained through the mobile telecommunications network that is based on the time corresponding with the current location of the device differ, and wherein when the base station is located in a first time zone and the device is located in a second time zone, then
        (A) notifying a user of a time attribute deviation by indicating that the time set on the device differs from the time corresponding with the current location of the device,
        (B) presenting an option to the user to select between accepting and declining a time attribute update, and
        (C) receiving a user selection to accept the time attribute update, wherein the time attribute updater communicates an update indication to an operating system of the device to modify the first time attribute based on the time set on the device to conform with the second time attribute based on the time corresponding with the current location of the device.

2. The wireless system of claim 1 further comprising an authenticator to authenticate the device desiring to utilize the communications network.

3. The wireless system of claim 1, wherein communicating an update indication to an operating system of the device to modify the first time attribute to conform with the second time attribute comprises requesting an updating module to update the first time attribute to conform with the second time attribute.

4. The wireless system of claim 3, wherein the updating module comprises at least a portion of the operating system.

5. The wireless system of claim 1, wherein the time attribute updater or an updating module updates the first time attribute to conform with the second time attribute.

6. The wireless system of claim 1, wherein the time attribute updater or an updating module presents a user with an option to update the first time attribute to conform with the second time attribute.

7. The wireless system of claim 1, wherein the time attribute may comprise a time value, a time zone, a date, a day of the week, a month, a year, a timekeeping convention, or a combination thereof.

8. One or more nontransitory computer-readable media having computer-executable instructions embodied thereon that, when executed perform a method for deriving a time attribute of a device, the method comprising the steps of:
- obtaining a first time attribute based on a time set on the device;
- obtaining a second time attribute through a mobile telecommunications network based on a current location of the device;
- comparing on the device the first time attribute based on the time set on the device and the second time attribute based on a time at the current location of the device;
- determining that the first time attribute differs from the second time attribute;
- based on the determination that the first time attribute differs from the second time attribute, communicating an update indication to an operating system of the device to modify the time set on the device to conform with the time at the current location of the device being obtained through the mobile telecommunications network.

9. The media of claim 8 further comprising authenticating the device desiring to utilize a network.

10. The media of claim 8, wherein obtaining the first time attribute based on the mode of the device comprises receiving the first time attribute based on the mode of the device.

11. The media of claim 8, wherein obtaining the second time attribute based on the location of the device comprises receiving from a base station the second time attribute based on the location of the device.

12. The media of claim 8, wherein the device-location includes a location of a base station to which the device is connected.

13. The media of claim 8, wherein communicating an update indication to modify the first time attribute to conform with the second time attribute comprises requesting an updating module to update the first time attribute to conform with the second time attribute.

14. The media of claim 8 further determining whether the first time attribute corresponds with the second time attribute.

15. The media of claim 8 further comprising presenting to a user an option to update the first time attribute to conform with the second time attribute.

16. One or more nontransitory computer-readable media having computer-executable instructions embodied thereon that, when executed perform a method for deriving a time attribute of a device that is connected to a first base station, the method comprising the steps of:
- communicating one or more time attributes of a time setting of the device;
- receiving an update indication to modify a first time attribute that is based on a time set on the device to conform with a second time attribute that is based on a current location of the device, wherein the second time attribute is received by way of a mobile telecommunications network upon the device that is connected to the first base station being transferred to a second base station, and wherein the second time attribute was determined to be different than the first time attribute;
- notifying a user of a time attribute deviation;
- presenting an option to the user to select between accepting and declining a time attribute update; and
- receiving a user selection to accept the time attribute update.

17. The media of claim 16 further comprising updating the first time attribute to conform with the second time attribute.

18. The media of claim 16 further comprising determining the one or more time attributes of the device-mode.

* * * * *